(12) United States Patent
Yokota et al.

(10) Patent No.: US 7,280,680 B2
(45) Date of Patent: Oct. 9, 2007

(54) METHOD AND APPARATUS FOR OBSERVING THREE-DIMENSIONAL LOCALIZATIONS OF IN VIVO EXPRESSED GENES AS WELL AS METHOD AND APPARATUS FOR OBSERVING MINUTE THREE-DIMENSIONAL LOCALIZATIONS OF IN VIVO EXPRESSED GENES

(75) Inventors: Hideo Yokota, Wako (JP); Sakiko Nakamura, Wako (JP); Atsushi Yoshiki, Wako (JP); Akitake Makinouchi, Wako (JP); Ryutaro Himeno, Wako (JP); Toshiro Higuchi, Wako (JP)

(73) Assignee: Riken, Saitama (JP)

( * ) Notice: Subject to any disclaimer, the term of this patent is extended or adjusted under 35 U.S.C. 154(b) by 765 days.

(21) Appl. No.: 10/377,671

(22) Filed: Mar. 4, 2003

(65) Prior Publication Data

US 2003/0215121 A1    Nov. 20, 2003

(30) Foreign Application Priority Data

Mar. 4, 2002  (JP) .............................. 2002-057935
Mar. 4, 2002  (JP) .............................. 2002-057963

(51) Int. Cl.
*G06K 9/00*    (2006.01)

(52) U.S. Cl. ..................... 382/128; 382/154; 435/359

(58) Field of Classification Search ................ 382/128, 382/129, 130, 131, 132–134; 435/6, 7.21, 435/7.22, 7.23, 7.91, 7.92, 42, 252.3, 440, 435/463, 464.478, 481.482, 359, 362, 363, 435/464, 478, 480, 481, 482; 436/63, 519–522; 607/99; 424/9.1, 9.341, 9.351, 9.6, 140.1, 424/900

See application file for complete search history.

(56) References Cited

U.S. PATENT DOCUMENTS 5,432,081 A * 7/1995 Jefferson ................... 435/325

6,171,796 B1 * 1/2001 An et al. ....................... 435/6

(Continued)

FOREIGN PATENT DOCUMENTS

JP    6-258578    9/1994

(Continued)

OTHER PUBLICATIONS

Translation of Notification of Reasons for Rejection from Japan Patent Office for Patent Application No. 2002-057935, Mar. 2005 (Japanese text also attached).

(Continued)

*Primary Examiner*—Samir Ahmed
*Assistant Examiner*—Abolfazl Tabatabai
(74) *Attorney, Agent, or Firm*—Birch, Stewart, Kolasch & Birch, LLP

(57) ABSTRACT

In order to make observation of localizations of in vivo expressed genes possible in an entire individual living organism such as animals, and plants, a living genetic recombinant specimen containing a marker that can be detected at the time when specific genes are expressed is sequentially severed, sectional images each of which corresponds to an image of sections severed are photographed in every scissions of the living specimen, and three-dimensional observation of the living specimen is implemented on the basis of the images photographed in every scissions described above, whereby three-dimensional localizations of expressed genes are observed in the living specimen.

12 Claims, 15 Drawing Sheets

U.S. PATENT DOCUMENTS 6,495,355 B1 * 12/2002 Contag et al. ............... 435/189
6,821,759 B1 * 11/2004 Heintz et al. ............... 435/91.4

FOREIGN PATENT DOCUMENTS

| | | |
|---|---|---|
| JP | 7-109384 | 11/1995 |
| JP | 10-26586 | 1/1998 |
| JP | 10-123054 | 5/1998 |
| JP | 11-183803 | 7/1999 |
| JP | 11-183803 A | 7/1999 |
| JP | 11-305140 | 11/1999 |
| JP | 11-305140 A | 11/1999 |
| JP | P2000-301489 A | 10/2000 |
| JP | P2001-148160 A | 5/2001 |
| JP | 2001-281147 A | 10/2001 |
| JP | 2001-517090 A | 10/2001 |
| JP | P2002-22739 A | 1/2002 |
| JP | 2002-62480 A | 2/2002 |
| JP | 2002-148153 | 5/2002 |
| JP | 2002 534398 A | 10/2002 |
| JP | P2003-506677 A | 2/2003 |
| WO | WO-00 40274 A1 | 7/2000 |
| WO | WO 01/09591 A1 | 2/2001 |

OTHER PUBLICATIONS

"Green Mice and Their Potential Usage in Biological Research" Ikawa et al. FEBS Letters 430 (1998) pp. 83-87.

* cited by examiner

METHOD AND APPARATUS FOR OBSERVING THREE-DIMENSIONAL LOCALIZATIONS OF IN VIVO EXPRESSED GENES AS WELL AS METHOD AND APPARATUS FOR OBSERVING MINUTE THREE-DIMENSIONAL LOCALIZATIONS OF IN VIVO EXPRESSED GENES

BACKGROUND OF THE INVENTION

1. Field of the Invention

The present invention relates to a method and an apparatus for observing three-dimensional localizations of in vivo expressed genes as well as a method and an apparatus for observing minute three-dimensional localizations of in vivo expressed genes, and more particularly to a method and an apparatus for observing three-dimensional localizations of in vivo expressed genes as well as a method and an apparatus for observing minute three-dimensional localizations of in vivo expressed genes used suitably in the case when an expressed situation in a variety of genes is observed in living organisms such as animals and plants.

2. Description of the Related Art

Heretofore, such a procedure that a living organism to be used for a specimen (an expression "living organism to be used for specimen" is hereinafter referred optionally to as "living specimen" in the present specification) is sliced, and the sliced living specimen is observed, whereby a two-dimensional configuration of expressed genes is observed in the living specimen has been adopted in case of observing a localization of genes expressed inside a living organism, i.e., in vivo expressed genes.

Furthermore, it becomes possible to discriminate expressed sites of specific genes inside a living specimen in accordance with such a manner that a marker (label), which can be detected at the time of gene expression, is incorporated in genes being objects to be observed, and then, a resulting living genetic recombinant specimen containing the genes into which the marker has been incorporated is observed in the case where the observation technique as described above is applied.

In this case, fluorescent materials, luminescent materials, coloring matters and the like may be used for such marker as described above. Specific examples thereof include GFP, EGFP, YFP, RFP, luciferin, melanin pigment and the like.

However, the observing techniques as described above involve such problems that a range, which can be observed, is limited in the case where an entire living specimen is looked through, because a stereoscopic microscope is used in comparatively broad macro observation as well as that observation is difficult upon a minute site, so that resolving power becomes poor.

For this reason, there has been such a problem that it is very difficult to observe localizations of in vivo expressed genes in an entire individual living organism according to a conventional observing technique.

On hand, while there is "in-situ Hybridization" as a method for observing sliced expressed genes, it is necessary for infiltrating a marker such as fluorescent materials, coloring matters and the like into the interior of a living specimen in this method, so that it is difficult to dye homogeneously the interior of the living specimen.

Besides, when the observation as described above is implemented, such an observing technique wherein a confocal laser microscope is used has been applied in case of micro observation by which a minute region is observed. In this case, however, a range, which can be observed by such technique as described above, is narrow, in other words, an extent of which is only up to around 100 µm from its surface of a living specimen to be observed in the thick direction thereof.

Therefore, there has been such a problem that it is extremely difficult to observe three-dimensional localizations of in vivo expressed genes in an entire individual living organism.

OBJECTS AND SUMMARY OF THE INVENTION

The present invention has been made in view of the problems involved in the conventional technology as described above, and an object of the invention is to provide a method and an apparatus for observing three-dimensional localizations of in vivo expressed genes by which observation of such localizations of in vivo expressed genes is made possible in an entire individual living organism such as animals, and plants.

On one hand, the present invention has been made in view of the problems involved in the conventional technology as described above, and an object of the present invention is to provide a method and an apparatus for observing minute three-dimensional localizations of in vivo expressed genes by which it makes possible an entire individual living organism to apply as an objective region to be observed, and to observe localizations of in vivo expressed genes in a minute region even in a single cell level within the objective region to be observed.

For the sake of achieving the above-described object, it is arranged in a method or an apparatus for observing three-dimensional localizations of in vivo expressed genes according to the present invention in such that a living genetic recombinant specimen containing a marker that can be detected at the time when specific genes are expressed is sequentially severed, observation of sectional images each of which corresponds to an image of sections severed is repeated in every scissions, and three-dimensional configurations inside the living specimen are reconstructed, whereby three-dimensional localizations of expressed genes are observed in the living specimen.

Namely, according to the present invention, a living genetic recombinant specimen containing a marker that can be detected at the time when specific genes are expressed is sequentially severed, sectional images each of which corresponds to an image of sections severed are photographed in every scissions of the above-described living specimen, and three-dimensional observation of the above-described living specimen is implemented on the basis of the images photographed in every scissions described above, whereby three-dimensional localizations of expressed genes are observed in the above-described living specimen.

Furthermore, the present invention is arranged in such that three-dimensional localizations of expressed genes are observed in a living specimen through the use of an apparatus, which comprises a living genetic recombinant specimen containing a marker that can be detected at the time when specific genes are expressed; a severing means for severing sequentially the above-described living specimen; an image pick-up means for photographing sectional images each of which corresponds to an image of the sections severed in every scissions of the above-described living specimen; and an image-processing means for producing three-dimensional images of the above-described living specimen on the basis of the images photographed by the above-described image pick-up means; the three-dimensional images of the above-described living specimen produced by the above-described image-processing means being observed, whereby three-dimensional localizations of expressed genes are observed in the above-described living specimen.

On one hand, in order to achieve the above-described object, it is arranged in a method or an apparatus for observing minute three-dimensional localizations of in vivo expressed genes according to the present invention in such that a living genetic recombinant specimen containing a marker that can be detected at the time when specific genes are expressed is sequentially severed, observation of sectional images each of which corresponds to an image of sections severed obtained by confocal photographing in every scissions is repeated, and three-dimensional configurations inside the living specimen are reconstructed, whereby minute three-dimensional localizations of expressed genes are observed in the living specimen.

Namely, the present invention comprises a first step for extruding sequentially a living genetic recombinant specimen containing a marker that can be detected at the time when specific genes are expressed in a certain direction; a second step for severing sequentially the above-described living genetic recombinant specimen extruded in the above-described first step; a third step for condensing light on sections of the above-described living genetic recombinant specimen severed in the above-described second step and photographing two-dimensional images of the above-described sections by the use of light reflected from the sections on which the above-described light was condensed; and a fourth step for implementing three-dimensional observation of the above-described living genetic recombinant specimen on the basis of the two-dimensional images photographed in the above-described third step.

In the present invention, the above-described light may be laser beam having a prescribed wavelength.

Moreover, the present invention comprises an extruding means for extruding sequentially a living genetic recombinant specimen containing a marker that can be detected at the time when specific genes are expressed in a certain direction; a severing means for severing sequentially the above-described living genetic recombinant specimen extruded by the above-described extruding means; a confocal image pick-up means for condensing light on sections of the above-described living genetic recombinant specimen severed by the above-described severing means and photographing two-dimensional images of the above-described sections by the use of light reflected from the sections on which the above-described light was condensed; and an image processing means for processing three-dimensional observation of the above-described living genetic recombinant specimen on the basis of the two-dimensional images photographed by the above-described confocal image pick-up means.

Furthermore, in the present invention, the above-described confocal image pick-up means maybe a device provided with a Nipkow disk having a plurality of pin holes, a micro lens array disk having a plurality of micro lens arrays at positions corresponding to the pin holes of the above-described Nipkow disk, and a rotating means for rotating integrally the above-described Nipkow disk with the above-described micro lens array disk, whereby laser beam is condensed on the respective pin holes by means of the plurality of the above-described micro lens arrays corresponding thereto.

Moreover, the above-described confocal image pick-up means may be a confocal microscope in the present invention.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

An example of a preferred embodiment of a method and an apparatus for observing three-dimensional localizations of in vivo expressed genes as well as a method and an apparatus for observing minute three-dimensional localizations of in vivo expressed genes according to the present invention will be described in detail hereinafter by referring to the accompanying drawings.

Figure 1:
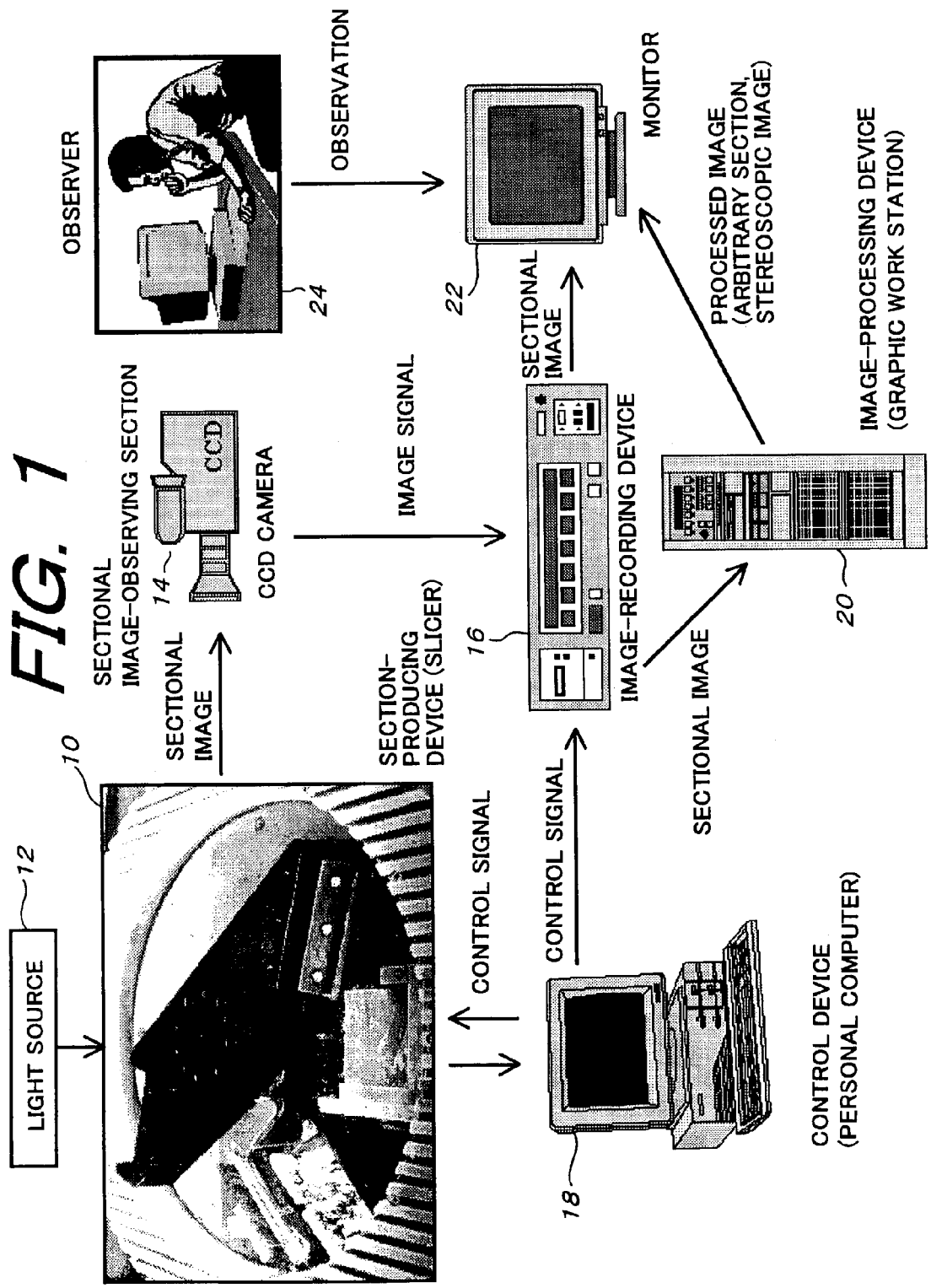
FIG. 1 is a conceptual, constitutive explanatory view illustrating an example of a preferred embodiment of an apparatus for observing three-dimensional localizations of in vivo expressed genes according to the present invention.
Figure 10:
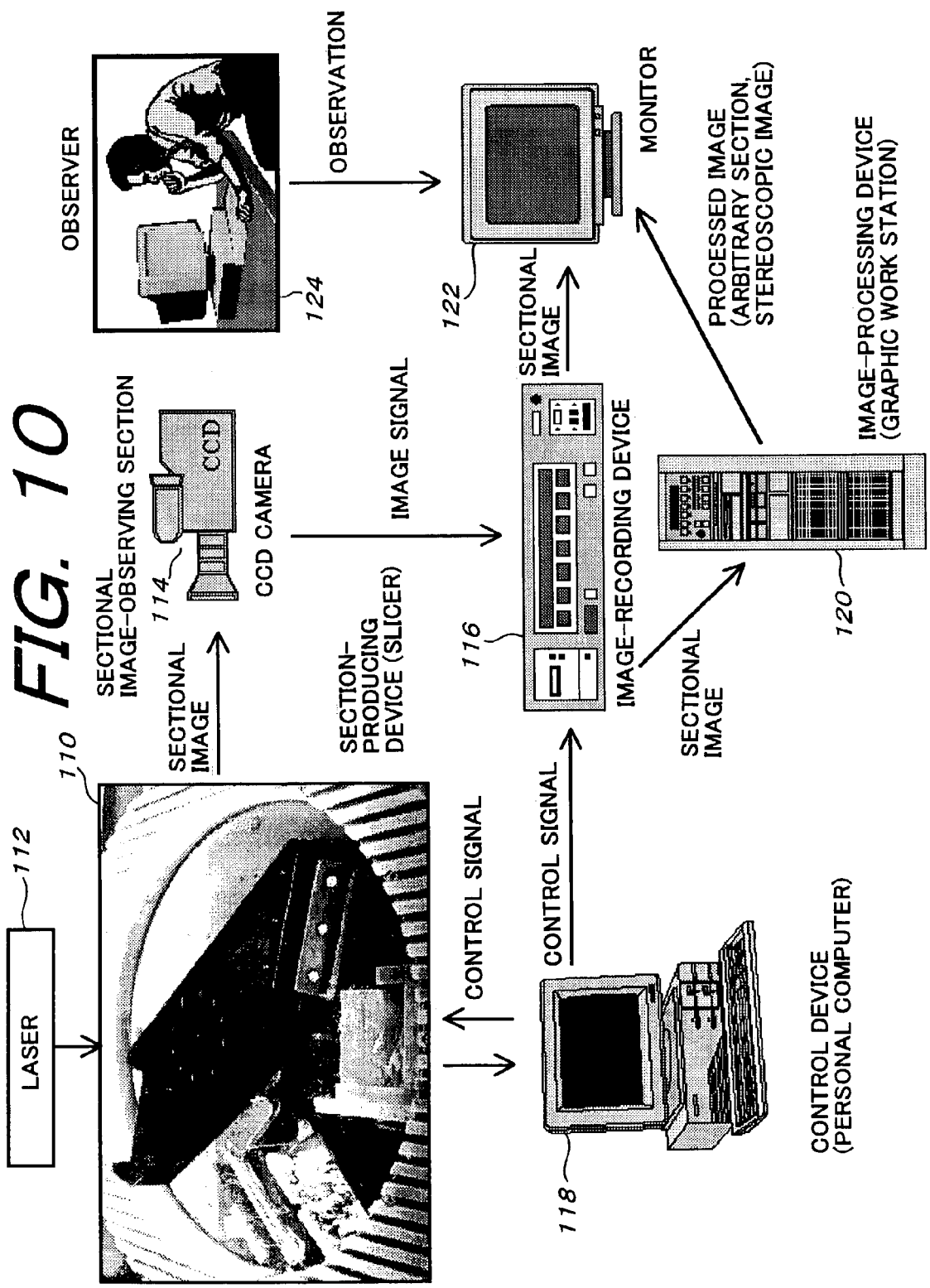
FIG. 10 is a conceptual, constitutive explanatory view illustrating an example of a preferred embodiment of an apparatus for observing minute three-dimensional localizations of in vivo expressed genes according to the present invention.

FIG. 1 is a conceptual, constitutive explanatory view illustrating an example of a preferred embodiment of an apparatus for observing three-dimensional localizations of in vivo expressed genes according to the present invention, and further, FIG. 10 is a conceptual, constitutive explanatory view illustrating an example of a preferred embodiment of an apparatus for observing minute three-dimensional localizations of in vivo expressed genes according to the present invention.

In the apparatus for observing three-dimensional localizations of in vivo expressed genes as well as the apparatus for observing minute three-dimensional localizations of in vivo expressed genes (hereinafter referred optionally to as "present apparatus"), a genetic recombinant containing genes into which has incorporated a marker that can be detected at the time when specific genes are expressed is used as a living specimen being an objective sample to be observed.

In case of producing the above-described genetic recombinant containing a marker that can be detected at the time when specific genes are expressed, for example, a technique for injecting a recombinant DNA into an egg cell may be applied, or a technique for producing recombined genes by means of aggregation chimaera may also be used.

In other words, a genetic recombinant to be used for a living specimen in the present invention may be the one, which may be produced by any technique, so that the present invention is not limited by a technique for producing a genetic recombinant.

Moreover, fluorescent materials, luminescent materials, coloring matters and the like, which have been heretofore well known, may be employed as a marker in the present invention. Specific examples thereof include GFP, EGFP, YFP, RFP, luciferin, melanin pigment and the like. In this respect, markers are not limited to those described above, but materials other than that described above may be optionally used so far as they can be detected at the time when specific genes are expressed.

In case of detecting a marker, for example, electromagnetic wave may be applied. Specifically, since a manner wherein white light is used as electromagnetic wave is performed by detecting a specific wavelength, which has been reflected as a result of applying light having a broad-scale wavelength, observation becomes possible with white light, if a coloring matter is employed as a marker. In other words, when a coloring matter is used for a marker, an electromagnetic wave having a non-specific wavelength is irradiated on a specimen, whereby an electromagnetic wave having a specific wavelength is received, so that the marker is detected.

Furthermore, when a luminescent material is used for a marker, there is no need of irradiation of any electromagnetic wave upon a specimen, and the marker is detected as a result of receiving an electromagnetic wave having a specific wavelength in this case.

When a fluorescent material is used for a marker, an electromagnetic wave having a specific wavelength is irradiated on a specimen, whereby the electromagnetic wave having the specific wavelength is received, so that the marker is detected.

First, an example of a preferred embodiment of an apparatus for observing three-dimensional localizations of in vivo expressed genes according to the present invention will be described.

The present apparatus shown in FIG. 1 is provided with a section-producing device (slicer) 10 being a severing means with use of a knife for producing sections of a living specimen composed of genetic recombinant containing genes into which has been incorporated a fluorescent material being a marker (hereinafter referred optionally to as "maker-incorporated living genetic recombinant specimen"), these genes exhibiting a different behavior from the other genes in such that when they are irradiated with light having a prescribed wavelength in case of expression thereof in its living organism, they emit light or they are colored as a result of excitation due to the above-described light irradiation; a light source 12 for irradiating light having a prescribed wavelength with respect to sections of the marker-incorporated living genetic recombinant specimen produced by the section-producing device 10 to excite the marker in the marker-incorporated living genetic recombinant specimen; a sectional image-observing section being an image pick-up means composed of a CCD camera 14 or the like for photographing images of sections of the marker-incorporated living genetic recombinant specimen, the sections being produced by the section-producing device 10 and on which has been irradiated light having a prescribed wavelength from the light source 12; an image-recording means 16 for storing images of sections of the marker-incorporated living genetic recombinant specimen, which were photographed by the sectional image-observing section; a control device 18 composed of a personal computer or the like for outputting control signals to control operations of the section-producing device 10 and the image-recording device 16; an image-processing device (graphic work station) 20 being an image-processing means for processing the images of sections of the marker-incorporated living genetic recombinant specimen, which have been stored in the image-recording device 16 to produce arbitrary processed images such as sectional, and stereoscopic images (three-dimensional images); and a monitor 22 for displaying images in sections of the marker-incorporated living genetic recombinant specimen, which have been stored in the image-recording device 16, or the processed images such as arbitrary sectional, and stereoscopic images (three-dimensional images), which were processed by the image-processing device 20; in this condition, an observer 24 supervises the monitor 22 to observe an expressed condition of marker-incorporated genes in the marker-incorporated living genetic recombinant specimen.

It is to be noted that the light source 12 is not required for the present apparatus in the case where a luminescent material or the like is used as a marker.

For the section-producing device 10, the sectional image-observing section, the image-recording device 16, the control device 18, the image-processing device 20, and the monitor 22, for example, devices disclosed in Japanese Patent Publication No. 1995-109384 "Automatic detecting apparatus provided with excising device for sample surface", Japanese Patent Laid-Open No. 1998-26586 "Method for observing specimen and apparatus therefor", Japanese Patent Laid-Open No.1998-123054 "Method for observing specimen and apparatus therefor" and the like, which have been proposed by the present inventors, may be used.

An apparatus disclosed in each of the above-described publications is the one wherein a specimen to be observed is severed, and observation for sectional images of sections severed is repeated, whereby a three-dimensional configuration inside the specimen is reconstructed.

In the above-described construction, an example of operations in the present apparatus will be described. In this case, a marker-incorporated living genetic recombinant specimen may be those produced by a variety of methods as described above.

Moreover, as the light source 12 for exciting a marker, for example, a halogen light source, a xenon-mercury light source and the like may be used optionally in combination with a filter or the like. Namely, white light, fluorescent light and the like may be optionally applied for light irradiated from the light source 12.

In other words, when a halogen light source and a xenon-mercury light source with an optical filter are used for the light source 12, it becomes possible to implement simultaneously white light observation by means of the halogen light source and fluorescence observation due to V. B. G excitation by means of the xenon-mercury light source and the optical filter.

In the preferred embodiment, the section-producing device 10 can sever a marker-incorporated living genetic recombinant specimen having a dimension, for example, from "15 mm×12 mm×120 mm to 180 mm×150 mm×200 mm" into a piece having a thickness of 10 µm at the least thickness.

In the sectional image-observing section, light emitted from the light source 12 is irradiated on a section severed in every scissions of the marker-incorporated living genetic recombinant specimen by means of the section-producing device 10, whereby the section severed of the marker-incorporated living genetic recombinant specimen is observed. The sectional image-observing section can be arranged in such that a section severed of a marker-incorporated living genetic recombinant specimen is observed simultaneously in accordance with white light observation with the use of a halogen light source and fluorescence observation due to V.B.G excitation with the use of a xenon-mercury light source and an optical filter.

The image-recording device 16 is controlled by the image-processing device 20 in such that a sectional image as a result of observation with white light is first recorded, and then, a sectional image as a result of observation with fluorescent light is recorded with respect to the same section severed in the case when observed sectional images of sections severed are stored.

The image-processing device 20 processes sectional images stored in the image-recording device 16, thereby to output data indicating image or stereoscopic image in an arbitrary section in case of observation with white light, or data indicating image or stereoscopic image in an arbitrary section in case of observation with fluorescent light to the monitor 22, and the monitor 22 displays images based on the data output.

Then, experimental results according to the above present apparatus will be explained. In experiments, Green Mice (C57BL/6TgN (act-EGFP) OsbC14-Y01-FM131) (Reference 3 Ikawa et al. FEBS Letters 430 (1998) 83-87<'Green mice' and their potential usage in biological research>) recombined by connecting EGFP to actin promotor was used as a marker-incorporated living genetic recombinant specimen.

The marker-incorporated living genetic recombinant specimen was subjected to PFA fixation-PBS washing, and then, it was freeze-embedded. The embedded marker-incorporated living genetic recombinant specimen was severed by the section-producing apparatus 10 under an environment of "–45° C.". In the section-producing apparatus 10, a rotational frequency of a knife used for scission was 90 rpm, and a thickness in cutting was 30 µm.

Furthermore, observation was implemented with the use of white light and fluorescent light as a light source for observation by means of the light source 12, the number of sections cut was seventeen hundreds and thirty-six, a photographing time of sectional images was about thirty minutes.

Figure 2:
FIG. 2 is a photographic image showing an abdomen extracted from sequential sectional images observed with white light.
Figure 3:
FIG. 3 is a photographic image showing a chest extracted from sequential sectional images observed with white light.
Figure 4:
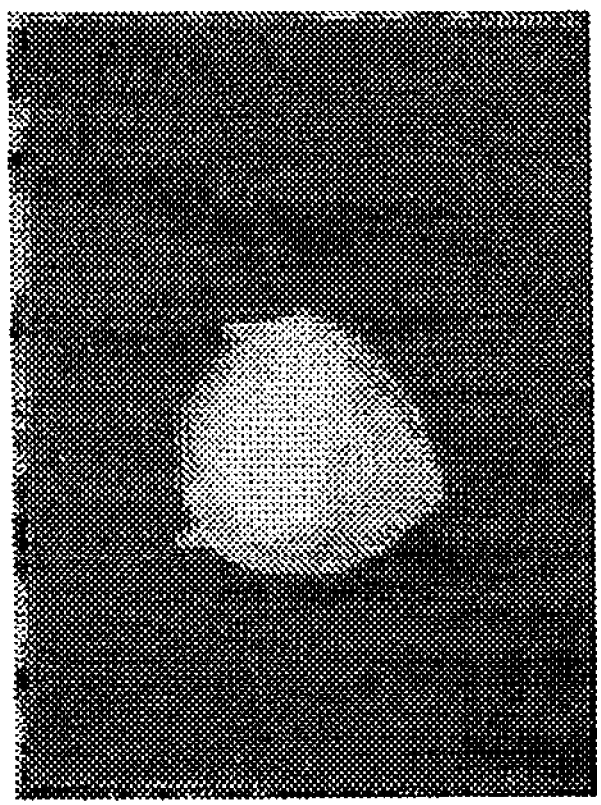
FIG. 4 is a photographic image showing a head extracted from sequential sectional images observed with white light.

FIGS. 2 through 4 show three photographic images extracted from sequential sectional images observed with white light wherein FIG. 2 is an image showing an abdomen, FIG. 3 is an image showing a chest, and FIG. 4 is an image showing a head, respectively.

Figure 5:
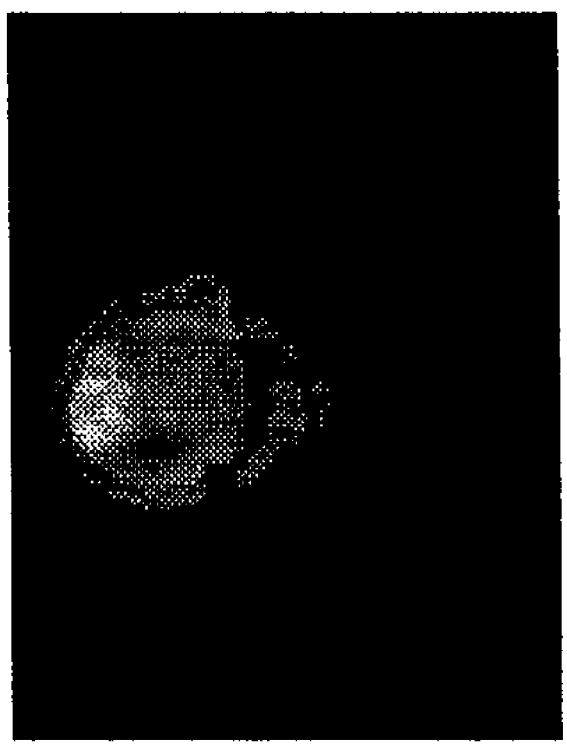
FIG. 5 is a photographic image showing an abdomen in the same section as that shown in FIG. 2 and it is extracted from sequential sectional images observed with fluorescent light.
Figure 6:
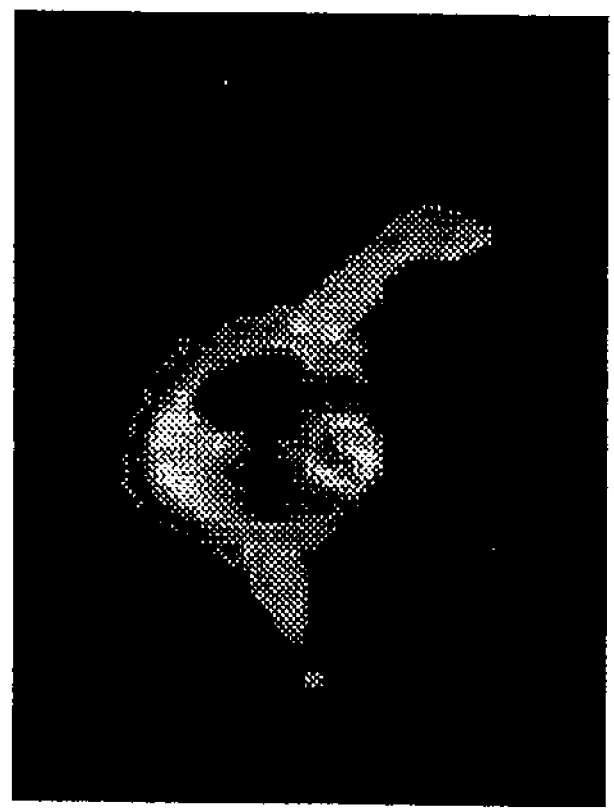
FIG. 6 is a photographic image showing a chest in the same section as that shown in FIG. 3 and it is extracted from sequential sectional images observed with fluorescent light.
Figure 7:
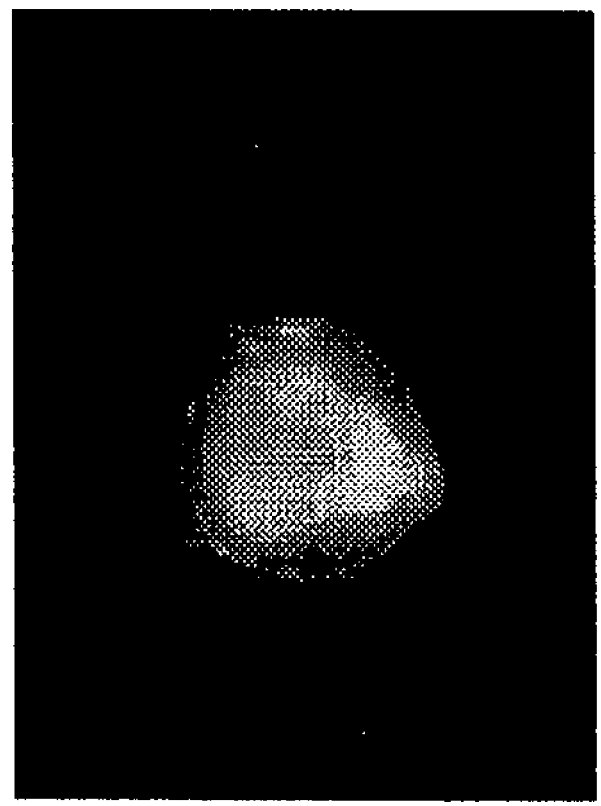
FIG. 7 is a photographic image showing a head in the same section as that shown in FIG. 4 and it is extracted from sequential sectional images observed with fluorescent light.

Moreover, results obtained by observing images with fluorescent light in the same sections as that shown in FIGS. 2 through 4, respectively, are shown in FIGS. 5 through 7 wherein FIG. 5 shows an image of the abdomen corresponding to that of FIG. 2, FIG. 6 shows an image of the chest corresponding to that of FIG. 3, and FIG. 7 shows an image of the head corresponding to that of FIG. 4, respectively.

In FIGS. 5 through 7, a thinner shaded part is a site in which GFP has been expressed (in reality, the site in which GFP has been expressed is green-colored in FIGS. 5 through 7, respectively).

Figure 8:
FIG. 8 is a stereoscopic image obtained by reconstructing a posture severed along a spine based on images photographed with white light.
Figure 9:
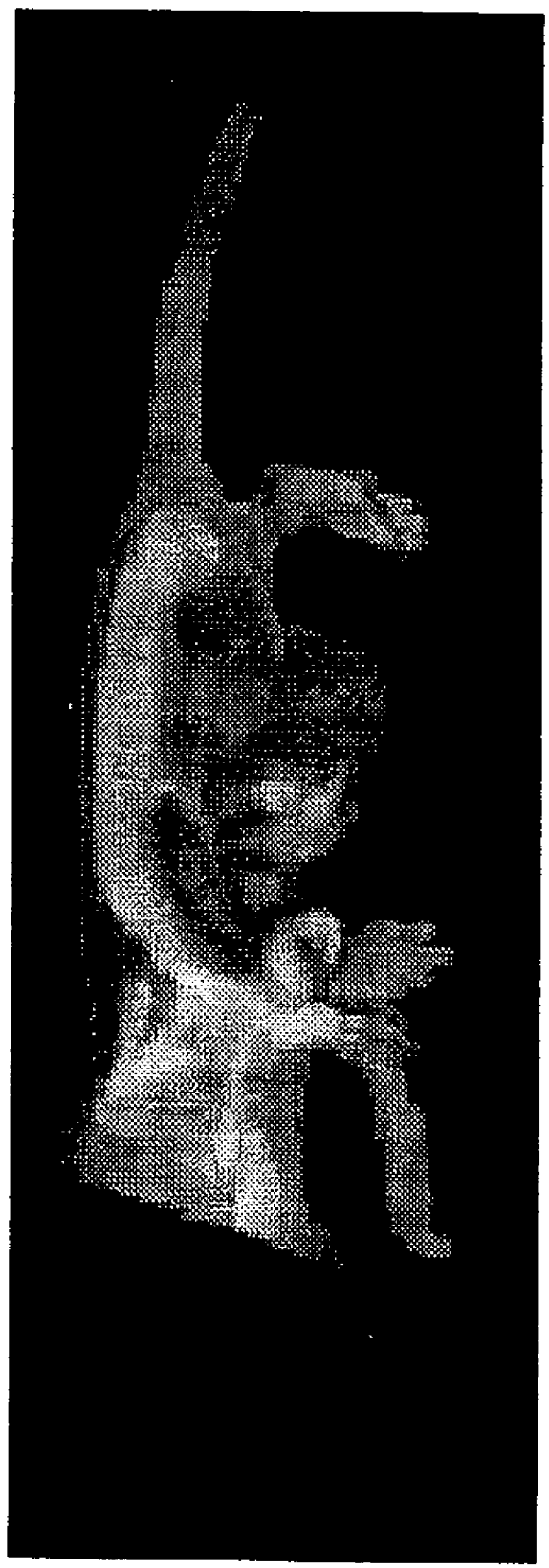
FIG. 9 is a stereoscopic image obtained by reconstructing a posture severed along a spine based on images observed with fluorescent light under the same condition as that shown in FIG. 8.

In the image-processing device 20, stereoscopic images were constructed by means of ray-casting on the basis of the sectional images recorded in the image-recording device 16. FIG. 8 shows a stereoscopic image severed along vertebra based on the image photographed with white light. FIG. 9 shows a stereoscopic image corresponding to that of FIG. 8 and it is constructed on the basis of an image observed with fluorescent light in the same condition as that of FIG. 8.

From the image with white light shown in FIG. 8, an entire appearance of internal organs and body is recognized, while such a fact that GFP has expressed remarkably at sites of cartilage, surface of skin and the like is found from the image with fluorescent light shown in FIG. 9.

In the marker-incorporated living genetic recombinant specimen used in the experiments, since GFP emanates fluorescence as a result of expressing actin, it is conjectured that expression of actin is active at the above-described sites.

Thus, it became possible according to the present apparatus that three-dimensional localizations of expressed genes were observed in an individual of a living specimen with micron degree of precision at high speed.

Since the method and apparatus for observing three-dimensional localizations of in vivo expressed genes according to the present invention are constructed as described above, they exhibit such excellent advantage that localizations of in vivo expressed genes can be observed in the entire of a living individual such as animals, and plants.

Next, an example of a preferred embodiment of an apparatus for observing minute three-dimensional localizations of in vivo expressed genes according to the present invention will be described.

The present apparatus shown in FIG. 10 is provided with a section-producing device (slicer) 110 for producing, with use of a knife being a severing means, sections of a living specimen composed of genetic recombinant containing genes into which has been incorporated a marker (hereinafter referred optionally to as "maker-incorporated living genetic recombinant specimen"), these genes exhibiting a different behavior from the other genes in such that when they are irradiated with light having a prescribed wavelength in case of expression thereof in its living organism, they emit light or they are colored; a laser 112 being a light source for irradiating light having a prescribed wavelength with respect to sections of the marker-incorporated living genetic recombinant specimen produced by the section-producing device 110 to excite the marker in the marker-incorporated living genetic recombinant specimen; a sectional image-observing section being an image pick-up means composed of a confocal image pick-up device and the like being a confocal image pick-up means containing a CCD camera 114 for photographing images of sections of the marker-incorporated living genetic recombinant specimen, the sections being produced by the section-producing device 110 and on which has been irradiated light having a prescribed wavelength from the laser 112; an image recording means 116 for storing images of sections of the marker-incorporated living genetic recombinant specimen, which have been photographed by the sectional image-observing section; a control device 118 composed of a personal computer or the like for outputting control signals to control operations of the section-producing device 110 and the image-recording device 116; an image-processing device (graphic work station) 120 being an image-processing means for processing the images of sections of the marker-incorporated living genetic recombinant specimen, which have been stored in the image-recording device 116 to produce arbitrary processed images such as sectional, and stereoscopic images (three-dimensional images); and a monitor 122 for displaying images in sections of the marker-incorporated living genetic recombinant specimen, which have been stored in the image-recording device 116, or the processed images such as arbitrary sectional, and stereoscopic images (three-dimensional images), which were processed by the image-processing device 120; in this condition, an observer 124 supervises the monitor 122 to observe an expressed condition of marker-incorporated genes in the marker-incorporated living genetic recombinant specimen.

It is to be noted that no light source, which is used for irradiating light to excite a marker, is required for the present apparatus in the case where a luminescent material or the like is used as the marker.

For the section-producing device 110, the sectional-image observing section, the image-recording device 116, the control device 118, the image-processing device 120, and the monitor 122, for example, devices proposed by the present inventors in Japanese Patent Application No. 2000-347398 "Method and apparatus for analyzing three-dimensional internal configuration" maybe used.

An apparatus disclosed in the above application is the one wherein a specimen to be observed is severed, observation for sectional images of sections severed is repeated, and a three-dimensional configuration inside the specimen is reconstructed.

More specifically, the section-producing device 110 repeats automatically such operations that it feeds upwardly a marker-incorporated living genetic recombinant specimen by a desired amount of cutting, and a knife rotating over the marker-incorporated living genetic recombinant specimen cuts the marker-incorporated living genetic recombinant specimen by the desired amount of cutting.

In this case, a device being an extruding means for feeding upwards a marker-incorporated living genetic recombinant specimen by a desired amount of cutting may be constructed in the form of, for example, a direct-acting device comprising a stepping motor and ball screws, and it may be arranged in such that the marker-incorporated living genetic recombinant specimen is sequentially extruded in a certain direction (upward direction in FIG. 2). A setting ability for extruding a marker-incorporated living genetic recombinant specimen may be set at, for example, 0.5 µm at minimum.

Furthermore, a severing means for severing a marker-incorporated living genetic recombinant specimen may be constructed in such that a knife is rotated horizontally by means of a driving means or the like, and the marker-incorporated living genetic recombinant specimen extruded is severed sequentially.

Figure 11:
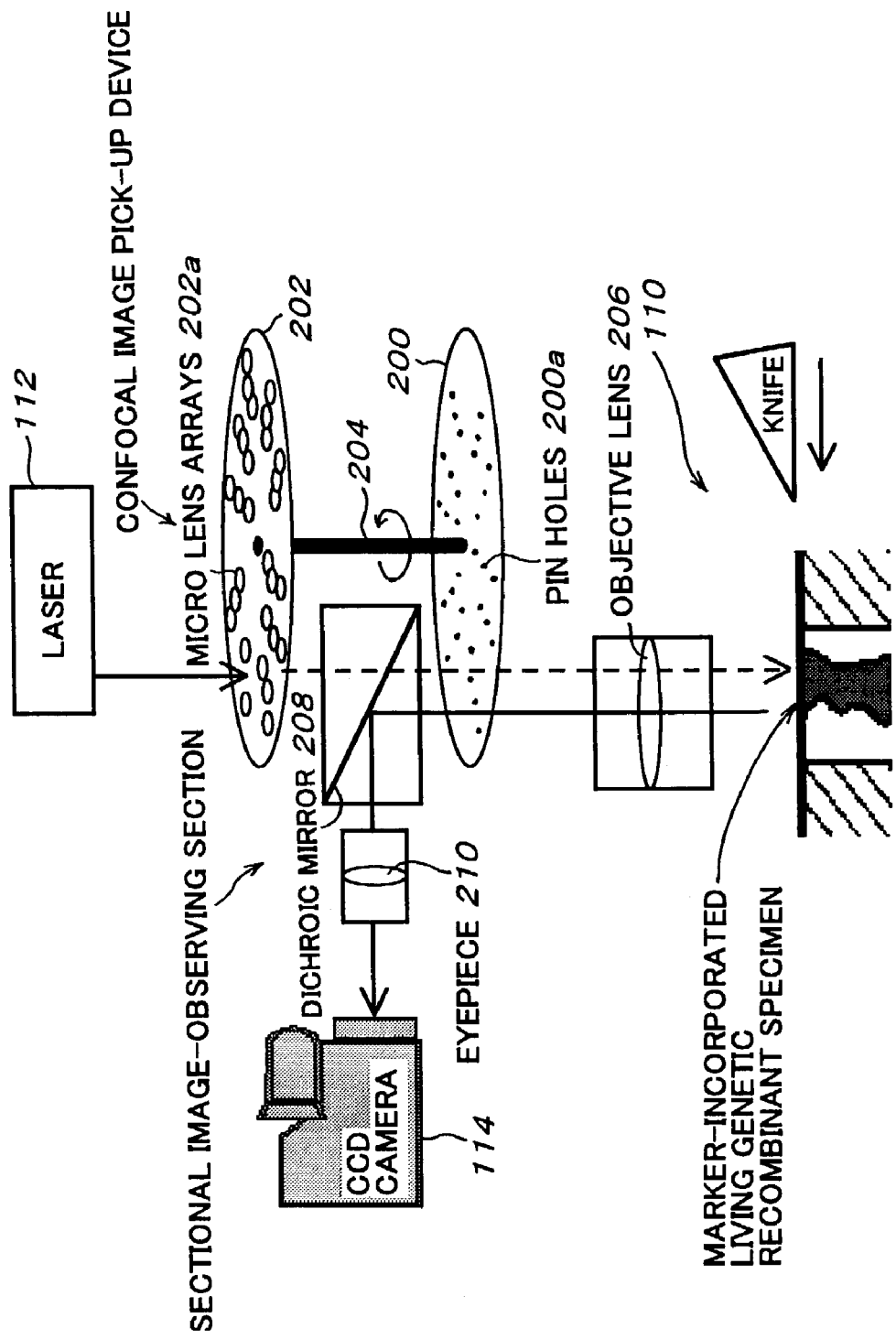
FIG. 11 is a schematic constitutive explanatory view illustrating essentially a confocal image pick-up means in a sectional image-observing section.

FIG. 11 is a schematic constitutive explanatory view illustrating essentially a confocal image pick-up means in a sectional image-observing section wherein the confocal image pick-up means involves a Nipkow disk 200 containing a plurality of pin holes 200a, a micro array lens disk 202 containing a plurality of micro array lenses 202a at positions corresponding to the pin holes 200a of the Nipkow disk 200, a rotating device 204 for rotating integrally the Nipkow disk 200 with the micro array lens disk 202, an objective lens 206 for condensing laser beam output from a laser 112 on a section of the marker-incorporated living genetic recombinant specimen, a dichroic mirror 208 for reflecting horizontally light reflected from the marker-incorporated living genetic recombinant specimen, and an eyepiece 210 for condensing the light reflected horizontally from the dichroic mirror 208 to input the light to a CCD camera 114.

In the confocal image pick-up device, according to the construction described above, the laser beam output from the laser 112 is condensed by means of the plurality of micro array lenses 202a on the corresponding respective pin holes 200a, and the laser beams passed through the plurality of pin holes 200a are condensed on a section obtained by severing the marker-incorporated living genetic recombinant specimen with the knife. Then, the light reflected from the section of the marker-incorporated living genetic recombinant specimen is reflected horizontally by the dichroic mirror 208, and the light thus reflected is photographed by the CCD camera 114 through the eyepiece 210, whereby the reflected light from plural points on the section is detected at the same time.

Besides, focal point of laser beam can be allowed to scan over the entire section severed by only rotating the Nipkow disk 200 and the micro array lens disk 202 by means of the rotating device 204 at high speed. As a result, a two-dimensional image of the entire section can be obtained in a short period of time.

In the present apparatus, according to the construction as described above, a marker-incorporated living genetic recombinant specimen is fixed by freezing or the like manner to embed the same.

Thereafter, a step for extruding a marker-incorporated living genetic recombinant specimen in a certain direction, a step for severing sequentially the marker-incorporated living genetic recombinant specimen extruded, and a confocal-photographing step for condensing laser beam output from the laser 112 on sections of the marker-incorporated living genetic recombinant specimen severed to photograph a two-dimensional image of the sections based on its reflected light are sequentially performed.

As a result, sequential sectional images in sections of the marker-incorporated living genetic recombinant specimen are obtained. Moreover, the sequential sectional images are processed with the image-processing device 120, and a three-dimensional internal configuration of the marker-incorporated living genetic recombinant specimen is displayed on the monitor 122.

According to the present apparatus as described above, laser beam is condensed only on severed sections of a marker-incorporated living genetic recombinant specimen by means of a confocal image pick-up device, whereby its reflected light is observed. As a result, influence of light other than that positioned at its focal point, for example, lack of hiding or the like of a marker-incorporated living genetic recombinant specimen can be substantially eliminated, and resolution of a two-dimensional image photographed can be elevated, so that an internal configuration of the marker-incorporated living genetic recombinant specimen can be reconstructed with high precision.

In the case when a material, which is excited with light to emit light or develop color, is used for a marker, a laser 112 may be used commonly as a light source for irradiating light on the marker and as a light source for a confocal image pick-up device.

It is to be noted that a light source for irradiating light on severed sections of a marker-incorporated living genetic recombinant specimen to excite a marker is not limited to the above-described laser, but, for example, a halogen light source, a xenon-mercury light source and the like may be used optionally in combination with a filter or the like. Namely, white light, fluorescent light and the like may be optionally applied for light irradiated from the above-described light source.

In other words, when a halogen light source and a xenon-mercury light source with an optical filter are used for the light source, it becomes possible to implement simultaneously white light observation by means of the halogen light source and fluorescence observation due to V.B.G excitation by means of the xenon-mercury light source and the optical filter.

In the preferred embodiment, the section-producing device 110 can sever a marker-incorporated living genetic recombinant specimen having a dimension, for example, from "15 mm×12 mm×120 mm to 180 mm×150 mm×200 mm" into a piece having a thickness of 10 µm at the least thickness.

In the sectional image-observing section, light emitted from the light source 112 is irradiated on its sections in every scissions of the marker-incorporated living genetic recombinant specimen by means of the section-producing device 110, whereby the sections of the marker-incorporated living genetic recombinant specimen are observed. The sectional image-observing section may be arranged in such that a section of a marker-incorporated living genetic recombinant specimen is observed simultaneously in accordance with white light observation with the use of a halogen light source and fluorescence observation due to V.B.G excitation with the use of a xenon-mercury light source and an optical filter.

The image-recording device 116 may be controlled by the image-processing device 120 in such that a sectional image as a result of observation with white light is first recorded, and then, a sectional image as a result of observation with fluorescent light is recorded with respect to the same section in the case when observed sectional images of sections are stored.

The image-processing device 120 processes sectional images stored in the image-recording device 116, thereby to output data indicating image or stereoscopic image in an arbitrary section in case of observation with white light, or data indicating image or stereoscopic image in an arbitrary section in case of observation with fluorescent light to the monitor 122, and the monitor 122 displays images based on the data output.

Then, experimental results according to the above present apparatus will be explained. In experiments, a genetic recombinant rice plant, which expresses GFP under the control of a promotor of gene OsTrxh, that is expressed specifically with respect to fibrovascular bundle was used as a marker-incorporated living genetic recombinant specimen, and a three-dimensional configuration of its expressed site was observed with fluorescence of GFP.

The marker-incorporated living genetic recombinant specimen was bred under an artificial light condition, then, its stem and a section changing from the stem to a root were cut off with a knife at the time when it was in seed, and the stem and the section cut off were freeze-embedded with the use of a freeze-embedding agent.

An observing condition was such that a cutting thickness of the marker-incorporated living genetic recombinant specimen was 2 µm, a rotational frequency of a section-producing device 110 used for the cutting was 90 rpm, and a temperature of the marker-incorporated living genetic recombinant specimen was "−45° C.".

For the knife of the section-producing device 110, a knife for microtome was used. The section of the marker-incorporated living genetic recombinant specimen, which was irradiated with laser beam obtained by 150 mw output from a laser 112, was observed.

Figure 12:
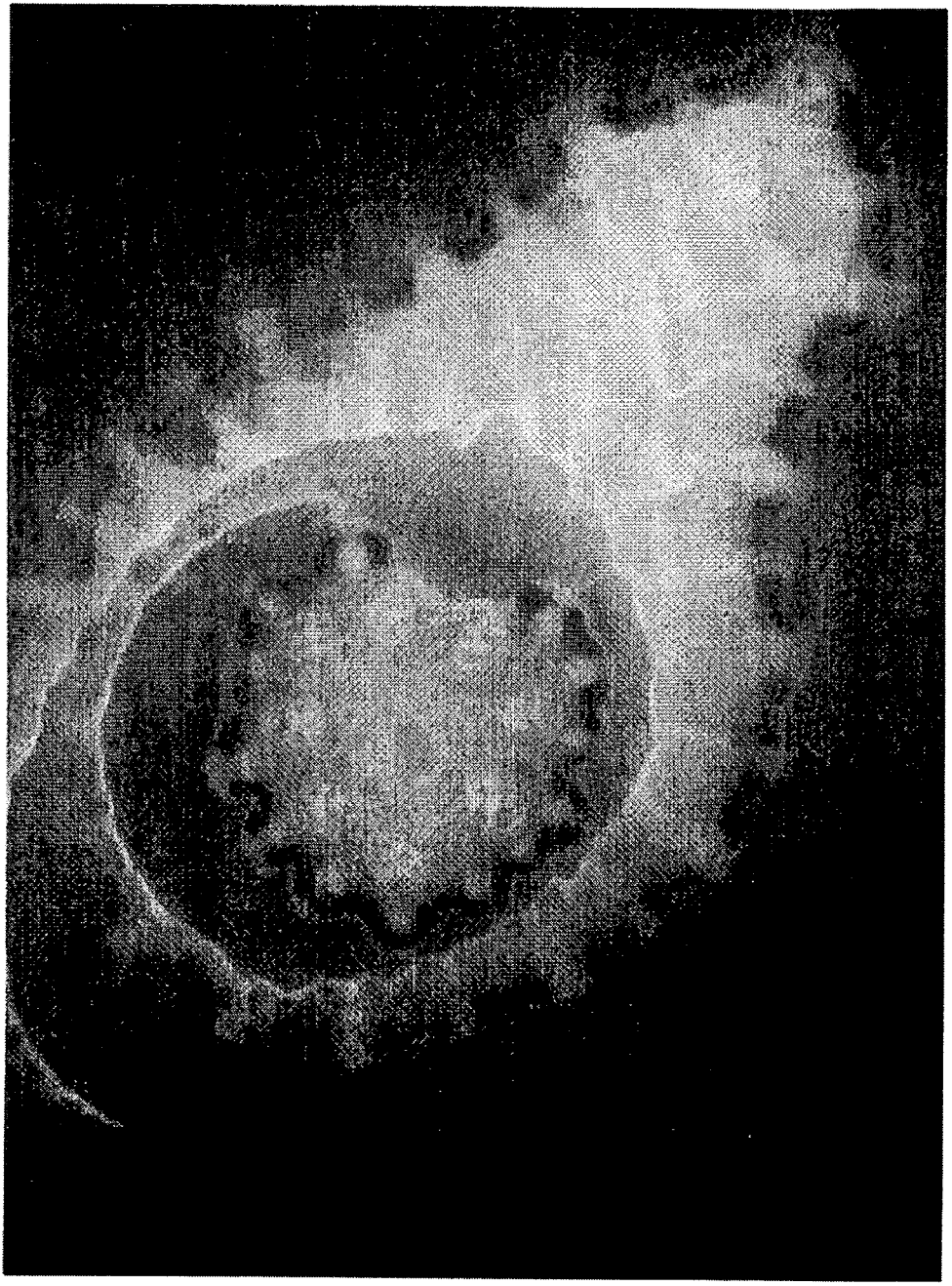
FIG. 12 is a sectional image of a stem of rice plant observed with epi-fluorescence by the use of a fivefold objective lens and it exhibits an observation result by means of a conventional sectional image-observing section wherein no confocal image pick-up means is used.
Figure 13:
FIG. 13 is a sectional image of a stem of rice plant observed with epi-fluorescence by the use of a twentyfold objective lens and it exhibits an observation result by means of a conventional sectional image-observing section wherein no confocal image pick-up means is used.

FIGS. 12 and 13 show observation results by means of a conventional sectional image-observing section wherein no confocal image pick-up means is used wherein FIG. 12 is a sectional image of a stem of rice plant observed with epi-fluorescence by the use of a fivefold objective lens 206, while FIG. 13 is a sectional image of a stem of rice plant observed with epi-fluorescence by the use of a twentyfold objective lens 206.

In FIGS. 12 and 13, a comparatively thinly shaded site (in reality, it is blue-colored) exhibits autofluorescence, and a site that is the most thinly shaded (in reality, it is green-colored) exhibits expressed genes due to GFP.

In epi-fluorescence, since there is a lack of hiding in a lower layer, GFP expressed site washes out, so that a broad localization can be recognized, but a detailed localization cannot be observed.

Figure 14:
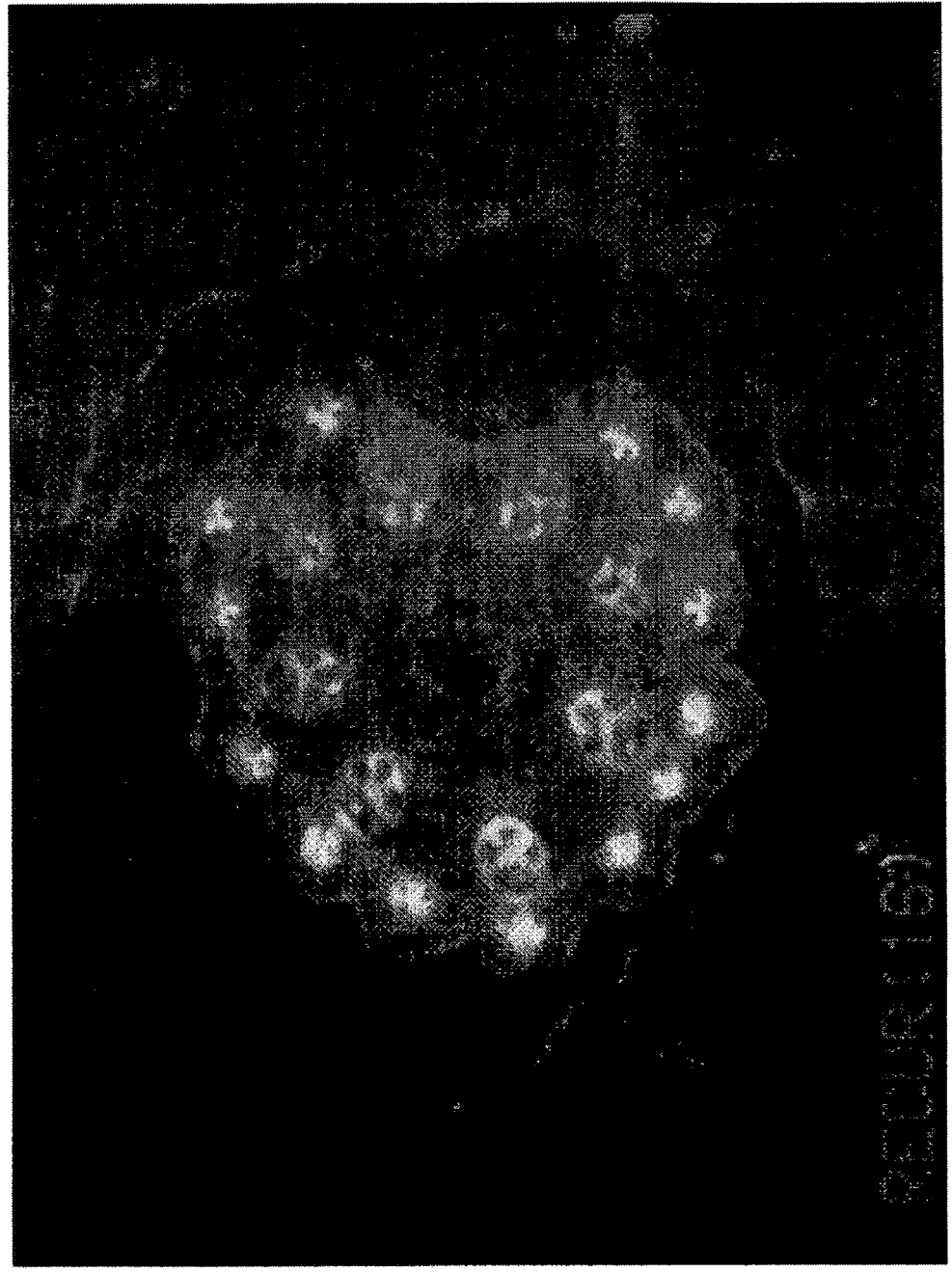
FIG. 14 is a sectional image of a stem of rice plant observed with epi-fluorescence by the use of a fivefold objective lens and it exhibits an observation result by means of a sectional image-observing section according to the present invention wherein a confocal image pick-up means is used.
Figure 15:
FIG. 15 is a sectional image of a stem of rice plant observed with epi-fluorescence by the use of a twentyfold objective lens and it exhibits an observation result by means of a sectional image-observing section according to the present invention wherein a confocal image pick-up means is used.

Furthermore, FIGS. 14 and 15 show observation results by means of a sectional image-observing section according to the present invention wherein a confocal image pick-up means is used, respectively. FIG. 14 is a sectional image of a stem of rice plant observed by means of the confocal image pick-up means in which a fivefold objective lens 206 is used, while FIG. 15 is a sectional image of a stem of rice plant observed by means of the confocal image pick-up means in which a twentyfold objective lens 206 is used.

From the above FIGS. 14 and 15, it is found that GFP expresses specifically around a fibrovascular bundle. In addition, it is also found that GFP expresses strongly in some cells constituting the fibrovascular bundle.

From the above description, it was found that three-dimensional localizations of expressed genes could be observed in a marker-incorporated living genetic recombinant specimen as a result of applying the sectional image-observing section according to the present invention wherein a confocal image pick-up device is used.

In this case, the specimen is not dyed later, but expressed genes are colored in a living organism, so that there is not any unevenness of dyeing inside the specimen, and it results in that coloring is not affected by size of a specimen.

Accordingly, the present invention involves both advantages of observation wherein there is no lack of hiding in its lower layer, because of application of a confocal image pick-up device and observation wherein there is no limitation in its depth direction, because of application of a section-producing device 110.

Moreover, the observation method according to the present invention does not depend upon a marker-incorporated living genetic recombinant specimen to be observed, so that minute three-dimensional localizations of a marker-incorporated living genetic recombinant specimen can be observed with respect to broadscale specimens.

It is to be noted that a confocal image pick-up device is not limited to the above-described construction, but, for example, confocal microscope may be used.

Since the method and apparatus for observing minute three-dimensional localizations of in vivo expressed genes according to the present invention are constructed as described above, they exhibit such excellent advantage that the entire of a living individual can be observed as a region to be observed, besides, localizations of in vivo expressed genes can be observed in a minute region of the above objective one to be observed even in a single cell level.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

The entire disclosure of Japanese Patent Application No. 2002-26066 filed on Feb. 1, 2002 including specification, claims, drawings and summary are incorporated herein by reference in its entirety.

What is claimed is:

1. A method for observing minute three-dimensional localizations of in vivo expressed genes comprising: a first step for extruding sequentially a living genetic recombinant specimen containing a marker that can be detected at the time when specific genes are expressed in a certain direction; a second step for severing sequentially said living genetic recombinant specimen extruded in said first step; a third step for condensing light on sections of said living genetic recombinant specimen severed in said second step and photographing two-dimensional images of said sections by means of light reflected from the sections on which said light was condensed; and a fourth step for observing three-dimensional configurations of said living genetic recombinant specimen on the basis of the two-dimensional images photographed in said third step.

2. A method for observing minute three-dimensional localizations of in vivo expressed genes as claimed in claim 1 wherein: said light is laser beam having said prescribed wavelength.

3. An apparatus for observing minute three-dimensional localizations of in vivo expressed genes comprising: an extruding means for extruding sequentially a living genetic recombinant specimen containing a marker that can be detected at the time when specific genes are expressed in a certain direction; a severing means for severing sequentially said living genetic recombinant specimen extruded by said extruding means; a confocal image pick-up means for condensing light on sections of said living genetic recombinant specimen severed by said severing means and photographing two-dimensional images of said sections by means of light reflected from the sections on which said light was condensed; and an image-processing means for processing three-dimensional observation of said living genetic recombinant specimen on the basis of the two-dimensional images photographed by said confocal image pick-up means.

4. An apparatus for observing minute three-dimensional localizations of in vivo expressed genes as claimed in claim 3 wherein: said confocal image pick-up means is a device provided with; a Nipkow disk having a plurality of pin holes; a micro lens array disk having a plurality of micro lens arrays at positions corresponding to the pin holes of said Nipkow disk; and a rotating means for rotating integrally said Nipkow disk with said micro lens array disk; whereby laser beam is condensed on said respective pin holes by means of the plurality of said micro lens arrays corresponding thereto.

5. An apparatus for observing minute three-dimensional localizations of in vivo expressed genes as claimed in claim 3 wherein: said confocal image pick-up means is a confocal microscope.

6. A method for observing three-dimensional localizations of in vivo expressed genes which comprises:
  photographing sectional images, which each correspond to an image of sections severed in every scissions of a living marker-incorporated genetic recombinant specimen,
  wherein in the case where the whole of a living individual of said living marker-incorporated genetic recombinant specimen is composed of a genetic recombinant containing one or more target genes into which an emitting material has been incorporated as a marker that can be detected at the time when said one or more target genes are expressed, said living marker-incorporated genetic recombinant specimen is seveied sequentially in a micron degree of accuracy;
  recording successively each of said sectional images photographed; and
  constructing a stereoscopic image on the basis of said sectional images to produce a three-dimensional image of the living marker-incorporated genetic recombinant specimen to detect the expression of the one or more target genes due to the emission of said emitting material, whereby three-dimensional localizations of in vivo expressed genes can be observed in the whole of said living individual ofthe living marker-incorporated genetic recombinant specimen.

7. A method for observing three-dimensional localizations of in vivo expressed genes which comprises:
  irradiating electromagnetic waves having a specific wavelength for exciting a fluorescent material, which is a marker for a living marker-incorporated genetic recombinant specimen containing one or more target genes into which the marker is incorporated, wherein in the case where the whole of a living individual of said living marker-incorporated genetic recombinant specimen is composed of a genetic recombinant containing genes into which the fluorescent material has been previously incorporated as the marker that can be detected at the time when said one or more target genes are expressed is severed sequentially in a micron degree of accuracy, onto each of sections severed in every scissions to photograph sectional images each of which corresponds to an image of sections severed in every scissions of said living marker-incorporated genetic recombinant specimen;

recording successively each of said sectional images photographed; and constructing a stereoscopic image on the basis of said sectional images recorded to produce a three-dimensional image of the living marker-incorporated genetic recombinant specimen that to detect expression of the one or more target genes due to the emission of said fluorescent material, whereby three-dimensional localizations of in vivo expressed genes can be observed in the whole of said living individual of the living marker-incorporated genetic recombinant specimen.

8. A method for observing three-dimensional localizations of in vivo expressed genes which comprises:

irradiating with incandescent light onto each section severed in every scissions of a living marker-incorporated genetic recombinant specimen to photograph incandescent light observations of sectional images, each of which corresponds to an image of sections severed in every scissions of said living marker-incorporated genetic recombinant specimen which was irradiated with said incandescent light;

irradiating with electromagnetic waves having a specific wavelength for exciting a fluorescent material, which a marker for the living marker-incorporated genetic recombinant specimen to photograph fluorescence observation sectional images that are sectional images which each corresponds to an image of sections of said living marker-incorporated genetic recombinant specimen which was irradiated with said electromagnetic waves, wherein in the case where the whole of a living individual of said living marker-incorporated genetic recombinant specimen is composed of a genetic recombinant containing one or more target genes into which the fluorescent material has been previously incorporated as the marker that can be detected when said one or more target genes are expressed is severed sequentially in a micron degree of accuracy;

recording successively each of said sectional images of said incandescent light observation sectional images and each of said sectional images of said fluorescence observation sectional images photographed; and constructing a first stereoscopic image on the basis of said incandescent light observation sectional images recorded and constructing a second stereoscopic image on the basis of said fluorescence observation sectional images recorded to produce a three-dimensional image of the living marker-incorporated genetic recombinant specimen in which a structure of a living body of said living marker-incorporated genetic recombinant specimen can be detected by said first stereoscopic image, and an expressing region of the one or more target genes can be detected by said second stereoscopic image, whereby three-dimensional localizations of in vivo expressed genes can be observed in the whole of said living individual of the living marker-incorporated genetic recombinant specimen.

9. An apparatus for observing three-dimensional localizations of in vivo expressed genes comprising:

a section producing device for severing sequentially the whole of a living individual of a living marker-incorporated genetic recombinant specimen in a micron degree of accuracy to sequentially produce severed sections of said living marker-incorporated genetic recombinant specimen;

a sectional image observation part for photographing sectional images of the sequentially produced sections of said living marker-incorporated genetic recombinant specimen;

an image recording device for recording sequentially said sectional images;

a control device for outputting control signals for controlling operations of said section producing device and said image recording device; and an image processing device for constructing a stereoscopic image on the basis of said sectional images recorded in said image recording device to produce a three-dimensional image the living marker-incorporated genetic recombinant specimen that can detect an expression of one or more target genes due to the emission of an emitting material, whereby three-dimensional localizations of in vivo expressed genes can be observed in the whole of said living individual of the living marker-incorporated genetic recombinant specimen.

10. An apparatus for observing three-dimensional localizations of in vivo expressed genes comprising:

a section producing device for severing sequentially the whole of a living individual of a living marker-incorporated genetic recombinant specimen in a micron degree of accuracy to sequentially produce severed sections of said living markerincorporated genetic recombinant specimen;

a light source for irradiating electromagnetic waves having a specific wavelength for exciting a fluorescent material being a marker for said living marker-incorporated genetic recombinant specimen with respect to each of sections of said living marker-incorporated genetic recombinant specimen produced sequentially by means of said section producing device;

a sectional image observation part for photographing sectional images of the sequentially produced sections of said living marker-incorporated genetic recombinant specimen;

an image recording device for recording sequentially said sectional images;

a control device for outputting control signals for controlling operations of said section producing device and said image recording device; and an image processing device for constructing a stereoscopic image on the basis of said sectional images recorded in said image recording device to produce a three dimensional image of the living marker-incorporated genetic recombinant specimen that can detect expression of one or more target genes being due to the emission of said fluorescent mateijal, whereby three-dimensional localizations of in vivo expressed genes can be observed in the whole of said living individual of the living marker-incorporated genetic recombinant specimen.

11. An apparatus for observing three-dimensional localizations of in vivo expressed genes comprising:

a section producing device for severing sequentially the whole of a living individual of a living marker-incorporated genetic recombinant specimen in a micron degree of accuracy to produce sequentially severed sections of said living marker-incorporated genetic recombinant specimen;

a light source for irradiating with incandescent light and electromagnetic waves having a specific wavelength for exciting said fluorescent material with respect to each of sections of said living marker-incorporated genetic recombinant specimen produced sequentially by means of said section producing device;

a sectional image observation part for photographing respectively, incandescent light observation sectional images, which are the sectional images each of which corresponds to an image of sections of said living marker-incorporated genetic recombinant specimen irradiated with said incandescent light from said light source and fluorescence observation sectional images, which are the sectional images each of which corresponds to an image of sections of said living marker-incorporated genetic recombinant specimen irradiated with said electromagnetic waves;

an image recording device for recording sequentially said incandescent light observation sectional images and said fluorescence observation sectional images;

a control device for outputting control signals for controlling operations of said section producing device, said light source, said sectional image observation part, and said image recording device; and an image processing device for constructing a first stereoscopic image on the basis of said incandescent light observation sectional images and a second stereoscopic image on the basis of said fluorescence observation sectional images to produce a three dimensional image of the living marker-incorporated genetic recombinant specimen in which a structure of a living body of said living marker-incorporated genetic recombinant specimen can be detected by said first stereoscopic image, and an expressing region of one or more target genes can be detected by said second stereoscopic image due to the emission of said fluorescent material, whereby three-dimensional localizations of in vivo expressed genes can be observed in the whole of said living individual of the living marker-incorporated genetic recombinant specimen.

12. A method for observing three-dimensional localizations of in vivo expressed genes which comprises:

irradiating incandescent light onto each of sections severed in every scissions of a living marker-incorporated genetic recombinant specimen and photographing sectional images which each correspond to an image of sections severed in every scissions of said living marker-incorporated genetic recombinant specimen which was irradiated with said incandescent light, wherein in the case where the whole of a living individual of said living marker-incorporated genetic recombinant specimen is composed of a genetic recombinant containing one or more target genes into which a coloring matter has been previously incorporated as a marker that can be detected at the time when the one or more target genes are expressed, said living marker-incorporated genetic recombinant specimen is severed sequentially in a micron degree of accuracy;

recording successively each of said sectional images photographed; and constructing a stereoscopic image on the basis of said sectional images recorded to produce a three dimensional image of the living marker-incorporated genetic recombinant specimen in which an expression of the one or more genes to can be detected by said coloring matter being the marker, whereby three-dimensional localizations of in vivo expressed genes can be observed in the whole of said living individual of the living marker-incorporated genetic recombinant specimen.

\* \* \* \* \*